Feb. 3, 1959  A. E. BURCH  2,871,961
HITCH FOR AN AGRICULTURAL TOOL
Filed Oct. 14, 1957

INVENTOR.
ARCHIE E BURCH
BY Alexander Riaboff
ATTORNEY

United States Patent Office 2,871,961
Patented Feb. 3, 1959

2,871,961

HITCH FOR AN AGRICULTURAL TOOL

Archie E. Burch, Williams, Calif.

Application October 14, 1957, Serial No. 690,015

5 Claims. (Cl. 172—255)

This invention relates to a hitch for an agricultural tool.

The primary object of this invention is to provide a hitch connecting a tractor with an agricultural tool, which hitch is adapted to operate automatically a mechanism carried by said tool when the tractor changes the direction of its travel, such as a mechanism for lifting a plow, or disks, out of the ground, or opening or closing a dispensing mechanism, or the like.

Another object of this invention is to provide a hitch of the type described which consists of a draw bar connecting said tractor and an agricultural tool and of an actuating arm one end of which is pivoted to the tractor, said arm being operated by a swinging motion of the draw bar, a free end of said arm being operatively connected with the mechanism carried by said agricultural tool so as to operate the same whenever the tractor changes its course.

Other objects and advantages will appear as the specification proceeds and the novel features of the device will be particularly pointed out in the claims hereto annexed.

In this specification and the annexed drawing the invention is illustrated in the form considered to be the best but it is understood that the invention is not limited to such form; and it is also to be understood that in and by the claims following the description, it is desired to cover the invention in whatsoever form it may be embodied.

This invention is illustrated in the accompanying drawings in which.

Figure 1:
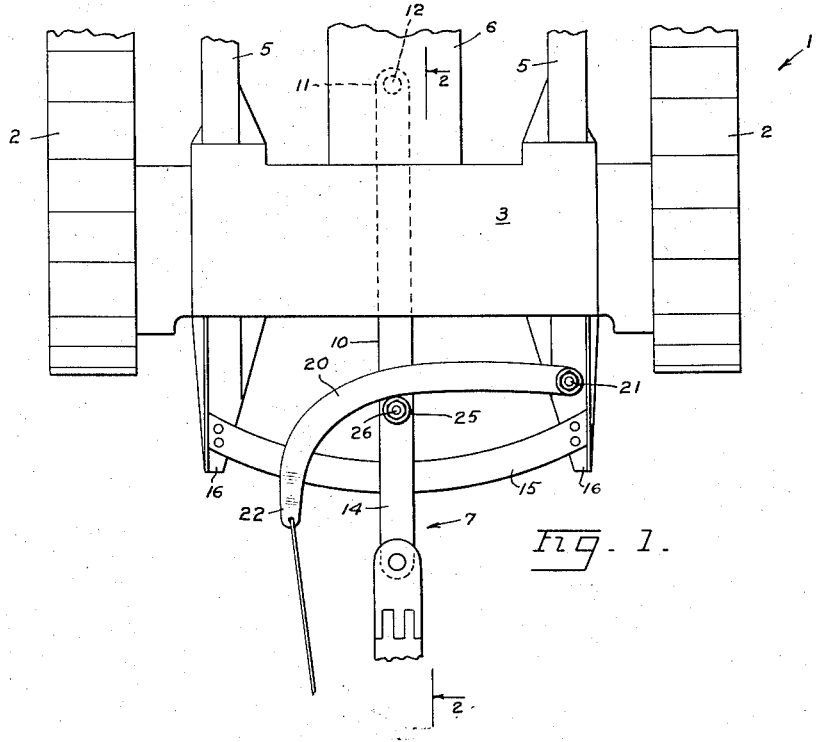
Fig. 1 is a diagrammatic plan view of the rear end of a tractor showing the hitch in normal position.
Figure 2:
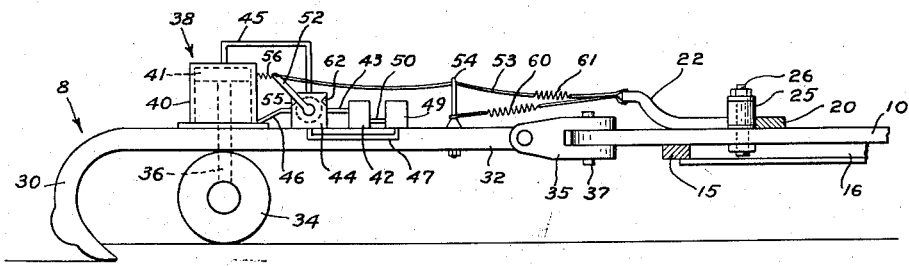
Fig. 2 is a side view of the hitch taken along the line 2—2 of Fig. 1 and of an agricultural tool drawn thereby.

In detail, Fig. 1 shows a rear end of a convention tractor 1, having a pair of caterpillar tracks 2, driven by a differential 3, the latter being secured to and supported by a tractor frame 5. Integral with said differential 3 is a transmission 6 extending forwardly and centrally from said differential. A hitch 7 connects said tractor 1 with an agricultural tool, such as a plow 8. The hitch 7 consists of a conventional draw bar 10 pivoted at its end 11 to the bottom of said transmission 6, or other part of the power plant, or the frame 5 by a pivot 12. The bar 10 is free to swing about the pivot 12 and extends rearwardly beyond the frame 5. The free end 14 of the bar 10 is slidably supported on an arch 15 the center of which is the pivot 12. The arch 15 is secured to the rear ends 16 of the frame 5 by rivets or the like. An actuating arm 20 is pivotally connected to the frame between said arch 15 and the differential 3. The arm 20 is preferably parabolic in plan view and extends from the pivot 21 substantially parallel to the differential 3 toward the draw bar 10 and thereafter curves sharply outwardly substantially parallel to said draw bar 10. The free end 22 of said actuating arm 20 is preferably turned upwardly, as shown in Fig. 2. The draw bar 10 carries a roller 25 freely rotating about a stub-shaft 26 secured thereto between the free end 14 and the differential 3. The actuating arm 20 abuts said roller 25 and whenever the draw bar 10 swings one way or another the roller 20 will push the actuating arm 20 toward the differential 3. The curvature of the actuating arm 20 is so selected that the swinging movement of the draw bar 10 produces considerably greater swinging motion of the actuating arm 20 thus providing a sensitive means for operating a mechanism on the agricultural tool 8 whenever the tractor begins to change its course of travel.

The agricultural tool 8 may be of any kind, and is diagrammatically shown in the drawings as a plow having a blade 30 secured to the end of a beam 32, which is supported by wheels 34. The beam 32 carries a universal joint 35 on its free end. The latter is secured to the drawing bar 10 by a pin 37. The tool 8 is shown as having a hydraulic mechanism 38 for raising and lowering the plow blade 30. It is to be understood that said agricultural tool and said mechanism are shown only for the purpose of illustration, and the same may be of any kind, shape, size and purpose and we do not wish to limit the hitch, which is the subject matter of this patent application, to the particular use shown in these drawings, as said hitch may be used with any agricultural tool or implement.

The hydraulic mechanism 38 includes a cylinder 40 having a piston 41 therein adapted to be moved downwardly by oil pumped thereinto by a pump 42. The piston 41 is connected with the wheels 34 by a shaft 36. A pipe 43 connects said pump with a control four way valve 44 which in turn is connected by a pipe 45 with the top of said cylinder 40, a pipe 46 with the bottom end of said cylinder and a pipe 47 with a storage oil tank 49, which is also connected with the pump 42 by a pipe 50.

The above mentioned control four way valve has a handle 52 connected by a cable 53, or the like, with the end 22 of the actuating arm 20. Fig. 2 shows said actuating arm 20 and said cable 53 in their normal position, said cable loosely hanging between said lever and the handle 52. The cable 53 is preferably supported by a support 54 secured to the beam 32. By having said cable 53 loosely hanging, as above said, small deviations by the tractor from its path will not operate the said control four way valve 44, as the motion of the actuating arm 20 will be spent on tightening the cable. Only considerable turns of the tractor will operate said valve.

When handle 52 is in the position shown in Fig. 2, it abuts a stop 55 formed on the valve and is held thereagainst by a spring 56, one end of which is secured to said handle and the other to said cylinder 40. When the handle 52 is in the above position, the control four way valve 44 connects the pipe 45 with the pipe 46 permitting oil from the upper part of the cylinder 40 to pass in the lower part, thus permitting the piston 41 to move upwardly. The oil from the pump 42 passes through the pipe 46 into the valve 44, through the pipe 47 into the storage tank 49.

When the operating arm 20 through the cable 53 swings the handle 52 substantially 90° to the right until the same is stopped by a second stop 62 on the valve 44, said control four way valve permits the oil to pass from the pump 42 through the pipe 43, pipe 45, into the top of the cylinder 40, thus forcing the piston 41 downwardly and forcing the oil in the lower part of said cylinder into the pipe 46, pipe 47, into the storage tank 49. The downward movement of the piston 41 raises the plow upwardly and pulls the plow blade 30 out of the ground. As soon as the turn is completed and the draw bar 10 and the actuating arm 20 take their normal position, the spring 56 pulls the handle 52 in its normal position, shown in Fig. 2, and the piston 41 raises to the top of the cylinder 40, thus lowering the plow blade 30 into the ground.

In order to keep the actuating arm 20 in constant abutment with the roller 25 a spring 60 is provided secured to the end 22 of said arm and to the support 54, which spring pulls said actuating arm toward said agricultural tool 8.

Another spring 61 is preferably provided on the cable 53 in order to permit the arm 20 to swing to its maximum, while the valve arm 52 rests on the second stop 62. The spring 61 should be stronger than the spring 56.

I claim:

1. A hitch for drawing an agricultural tool by a tractor carrying a mechanism to be automatically operated whenever the latter changes the direction of its travel, said hitch comprising a draw bar, one end of which is pivotally connected to the tractor, and the other end to the agricultural tool, an arch carried by the rear end of said tractor, said arch slidably supporting the other end of said draw bar, an actuating arm, one end of which is pivoted to said tractor, means secured to said draw bar for swinging said arm by the swinging motion of said draw bar, and means operatively connecting the free end of said arm to said mechanism.

2. A hitch for drawing an agricultural tool by a tractor carrying a mechanism to be automatically operated whenever the latter changes the direction of its travel, said hitch comprising a draw bar, one end of which is pivotally connected to the tractor, and the other end to the agricultural tool, an arch carried by the rear end of said tractor, said arch slidably supporting the other end of said draw bar, an actuating arm one end of which is pivoted to said tractor, a roller secured to said draw bar for swinging said arm by the swinging motion of said draw bar, and means operatively connecting the free end of said arm to said mechanism.

3. A hitch for drawing an agricultural tool by a tractor carrying a mechanism to be automatically operated whenever the latter changes the direction of its travel, said hitch comprising a draw bar, one end of which is pivotally connected to the tractor, and the other end to the agricultural tool, an arch carried by the rear end of said tractor, said arch slidably supporting the other end of said draw bar, a roller secured to said draw bar, an actuating arm, one end of which is pivoted to said tractor, means for resiliently keeping said arm in abutment with the roller for swinging said arm by the swinging motion of said draw bar, and means for operatively connecting the free end of said arm with said mechanism.

4. A hitch for drawing an agricultural tool by a tractor carrying a mechanism to be automatically operated whenever the latter changes the direction of its travel, said hitch comprising a draw bar, one end of which is pivotally connected to the tractor, and the other end to the agricultural tool, an arch carried by the rear end of said tractor, said arch slidably supporting the other end of said draw bar, a roller secured to said draw bar, an operating arm, one end of which is pivoted to the tractor and the other end operatively connected to said mechanism for actuating the same, means for keeping said arm in constant abutment with the roller, said arm being substantially parabolical in form, so that the swinging of said draw bar either way from its neutral position swings the actuating arm and actuates said mechanism.

5. A hitch for drawing an agricultural tool by a tractor carrying a mechanism to be automatically operated whenever the latter changes the direction of its travel, said hitch comprising a draw bar, one end of which is pivotally connected to the tractor, and the other end to the agricultural tool, an arch carried by the rear end of said tractor, said arch slidably supporting the other end of said draw bar, a roller secured to said draw bar, an operating arm, one end of which is pivoted to the tractor and the other end operatively connected to said mechanism for actuating the same, means for keeping said arm in constant abutment with the roller, said arm being substantially parabolical in form so that the swinging of said draw bar either way from its neutral position swings the actuating arm and actuates said mechanism, the swinging of the actuating arm being proportionately greater than that of the draw bar.

References Cited in the file of this patent

UNITED STATES PATENTS

| 2,251,788 | Goble | Aug. 5, 1941 |
| 2,651,983 | Weast | Sept. 15, 1953 |